Figure 3:
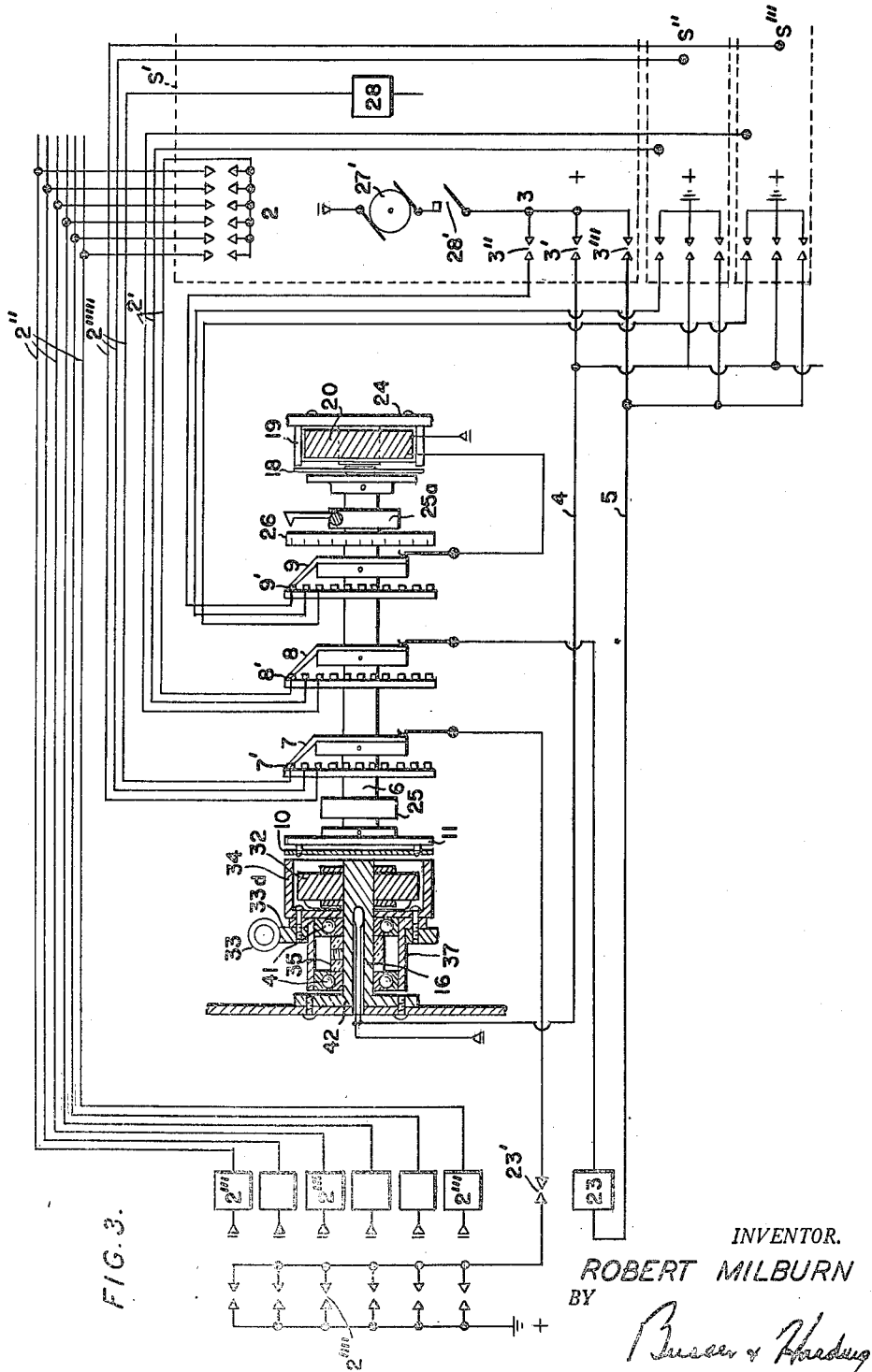

April 8, 1952
R. MILBURN
2,592,312
ELECTRIC IMPULSE COLLECTING AND
REGISTERING INSTALLATION
Filed Feb. 28, 1946
3 Sheets-Sheet 1
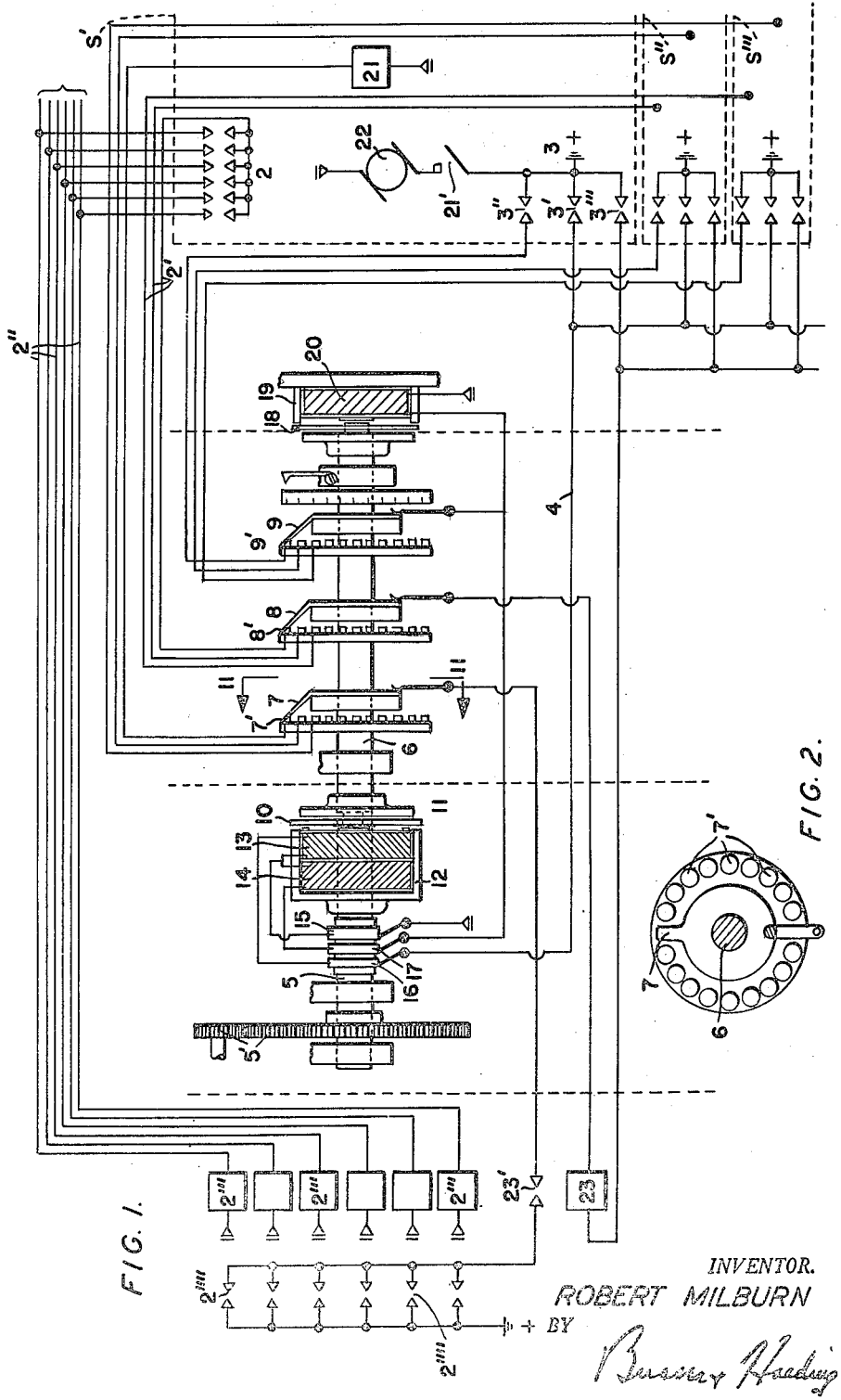
INVENTOR.
ROBERT MILBURN
BY
ATTORNEYS April 8, 1952
R. MILBURN
2,592,312
ELECTRIC IMPULSE COLLECTING AND
REGISTERING INSTALLATION
Filed Feb. 28, 1946
3 Sheets—Sheet 3
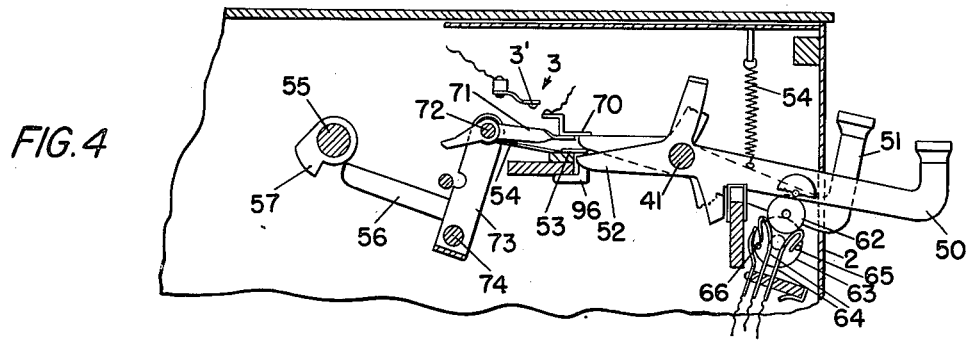
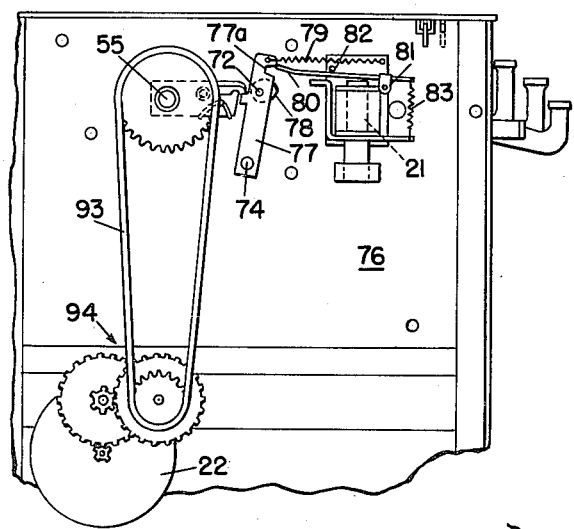
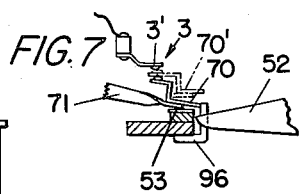
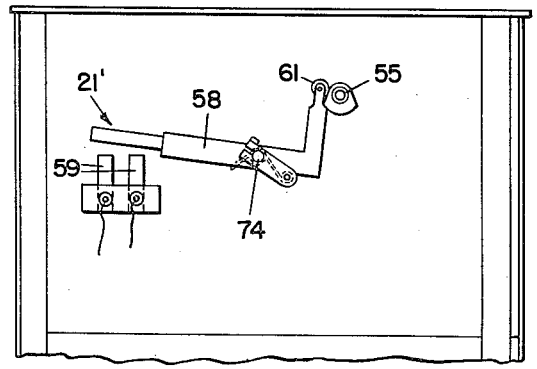
*INVENTOR.*
ROBERT MILBURN
BY
*ATTORNEYS*

Patented Apr. 8, 1952

2,592,312

UNITED STATES PATENT OFFICE 2,592,312

ELECTRIC IMPULSE COLLECTING AND REGISTERING INSTALLATION

Robert Milburn, London, England, assignor, by mesne assignments, to General Register Corporation, Long Island City, N. Y., a corporation of New York Application February 28, 1946, Serial No. 650,994
In Great Britain March 2, 1945

4 Claims. (Cl. 235—92)

This invention relates to electric impulse collecting or registering installations and to apparatus and circuit arrangements for use therewith.

The invention is capable of being utilised for a variety of purposes but is particularly concerned with installations such as totalisator installations incorporating a number of impulse generating or sending stations each capable of sending a multiplicity of impulses either of the same or different classes.

In such installations it is required to aggregate at a reception point or station the total number of impulses of all classes from all sending stations and also the total number of impulses of each individual class from all stations and the chief object of the present invention is to provide a simple, convenient and reliable means for achieving this end and for ensuring that coinciding or partially coinciding impulses are separated to perform their functions without disturbing each other and are received successively at the registering devices.

A further object of the invention is to provide an improved form of electric impulse collecting or registering installation which is capable of being operated at high speeds, or at higher speeds than installations which rely for their actuation upon the use of rotary collectors, rotary line switches that employ step by step or pawl and ratchet devices, the use of batches of relays and multiple contacts or the use of electro-mechanical devices, friction clutches or the like for operating an aggregating mechanism.

A further object is to provide means in an installation operating at high speed that will ensure impulse registration before an act such as issuance of a ticket is permitted to take place.

According to the invention in its broad aspect an electric impulse-collecting installation has a number of sending stations transmitting to a reception point where there is provided a multiple electric contact-hunting device comprising a rotatable unit moving one or more searcher arms over a respective group or groups of contacts electrically associated with the sending stations, a continuously-rotating member, a clutch for effecting a driving connection between the rotatable unit and the continuously-rotating member, means whereby each contact moved over by the searcher arm at the reception point can be electrically energised from a different sending station, and means whereby when the searcher arm comes on to an energised contact it completes a circuit to cause the searcher arm to be brought to rest on that contact. Means for registering the total of all operations at all the sending stations is preferably operated by current passing through a line common to all the sending stations. When the sending stations have a number of keys or like devices, e. g. corresponding to different classes of ticket to be issued, another searcher arm associated with all other similarly disposed groups of contacts may be provided to complete one of a corresponding number of electric circuits each of which actuates separate registering means, actuation of which prepares the circuit for completion by this searcher arm. Registering means when actuated may complete a circuit through another searcher arm associated with another similarly disposed group of contacts to operate some device, e. g. a ticket issuing device, at the corresponding sending station and to prepare the installation for another operation. The invention may also include other features which will be hereinafter described and claimed.

The invention will now be described in greater detail with reference to the accompanying diagrammatic drawings, which illustrate, by way of example, two modes in which the invention may be carried out as applied to a totalisator system. In these drawings, Figure 1 is a circuit diagram of one system with some parts indicated in section, Figure 2 is an end or sectional view taken on the line II—II of Fig. 1, Fig. 3 is a diagram similar to Fig. 1 but illustrating a modified system with an alternative form of clutch that may be used, Figures 4, 5 and 6 are fragmentary sectional elevations of a ticket issuing and printing machine showing a typical mechanical arrangement of a sending station as shown diagrammatically on the right-hand side of Figures 1 and 3, and Figure 7 is a showing of a portion of the apparatus shown in Figure 4 when the apparatus is in an at-rest position.

Referring to Figure 1 of the accompanying drawings, the totalisator system illustrated has a number of impulse-generating or sending stations of which, however, only three are indicated. These may be totalisators such as illustrated in Webb Patent 2,020,594. They include the parts enclosed by the three dashed lines S', S'' and S''' on the right of the diagram. The sending station S' is illustrated in greater detail than the sending stations S'' and S''', but it is to be understood that in practice all the sending stations of the system may be similar or alike.

Each of the aforesaid sending stations has a number of manually-operated keys, the number corresponding with the number of classes of tickets to be issued. In the example illustrated, each sending station has six of these "class" keys, as indicated at 2 in the station S'. Each key is adapted to close a pair of contacts. As shown, one contact of each pair is connected to a common line 2', of which there is one for each sending station. The other contact of each pair is connected to a separate line 2". Each line 2" is common to all the keys of the same class of all the sending stations and it is connected through a registering means 2''', for registering the number of tickets issued in each class, to negative. Each time one of the recording means 2''' is actuated, it closes a pair of contacts 2''''.

The arrangement is such that when a class key at 2 is operated, it not only closes the corresponding pair of contacts; it also causes three additional pairs of contacts to be closed. These are indicated at 3. They are arranged to remain closed until recording has become assured or has been completed, as will be explained hereinafter.

One of these three pairs of contacts, 3', establishes a circuit from positive over a "call line" 4, which is common to all the sending stations, to an electromagnetic driving clutch for effecting a driving connection between a driving shaft 5 and a rotatable unit in the form of a shaft 6 of non-magnetic material. The shaft 5 is continuously rotated by an electric motor, which is not shown, through gearing 5'. The speed of rotation depends upon the maximum number of sending station signals which have to be intercepted and distributed.

The shaft 6 carries three searcher arms 7, 8 and 9.

One of the elements of the aforesaid driving clutch is constituted by a disc 10 of magnetic material mounted on the end of the driving shaft 6 adjacent to the continuously-rotating driving shaft 5. The disc 10 is mounted so that it rotates with the shaft 6 but is able to make a limited axial movement on it. For this purpose it has a ring of holes through which pass freely pins fixed in a disc 11 fixed on the shaft 6 so that the disc floats on the shaft.

The other element of the driving clutch is constituted by a pot-like member 12 of magnetic material, shown in section, which is fixed co-axially on the shaft 5 with its open end towards the magnetic disc 10, which has the same diameter as the outside of the pot. The disc 10 is normally spaced from the pot 12 by a small air gap, e. g. one of the order of three-thousandths of an inch.

The pot 12 contains two similar energising coils 13 and 14 arranged one behind the other. The inner ends of the windings are connected together and to a slip ring 15 on the shaft 5, thence by way of a brush to negative. The outer ends of the windings of the two coils are connected to slip rings 16 and 17 respectively, the former of which is connected by way of a brush to the call line 4 already mentioned. The latter slip ring, 17, is connected by way of a brush to another brush which maintains continuous contact with searcher arm 9.

The other or right-hand end of the shaft 6 is provided with a magnetic disc 18 similar to disc 10. It co-operates with a second pot-like magnet device 19, shown in section, which is similar to 12 except that it contains only one energising coil 20 and is always stationary. The disc 18 and stationary magnet device 19, 20 together form a motion-arrestor or brake for the shaft 6. Coil 20 is connected between searcher arm 9 and negative.

The searcher arms 7, 8 and 9 sweep over sets of contacts 7', 8' and 9' respectively, the number of contacts in each of these sets being equal to the number of sending stations. The arm 7, its carrier, the brush maintaining continuous contact with it, and its set of contacts 7', are seen in end view in Figure 2, in which the shaft 6 appears in section. The other searcher arms and sets of contacts are similar.

The contacts 9' are each connected to one of the contacts of the pairs 3" at the sending stations. The contacts 8' are connected to the lines 2' common to the class contacts 2 at the sending stations. Each contact 7' is connected to a magnetic device 21, of which there is one at each sending station. When actuated, a magnetic device 21 closes a switch to start an electric motor 22 to cause a ticket to be issued, and it also re-opens the three pairs of contacts at 3.

One of the third pair of contacts, 3''', is connected to the brush of searcher arm 8 by way of registering means 23 for registering the total number of tickets of all classes that are issued. Each time the device 23 is actuated it closes a pair of contacts 23' in the common line connecting one of each pair of contacts 2'''' to the brush of searcher arm 7. The other contacts of these pairs are all connected to positive, as shown.

In Figures 4–7 there are shown elements of the totalizer mechanism disclosed in the above mentioned Webb patent comprising a sending station including a series of manually depressable keys 50 and 51 each pivotally mounted upon a spindle 41 mounted on a machine frame. Each key extends through a slot in a front panel of the machine casing and is normally maintained in an uppermost position, the position of key 50, by a spring 54. The forward end 52 of each key is located adjacent to the edge of a universal clutch bar 70 as shown in Figure 7. The bar 70 is connected at its ends by links 71 to a rod 72 aranged parallel to the bar 70. A locking bar 53 is connected by links 54 to a rod 72. The rod 72 is mounted in the ends of the arms of the stirrup member 73. The stirrup member is fixed to an oscillatable spindle 74 carried in bearings in the side plates of the machine frame.

The spindle 74 extending through the side plate 76 has an arm 77 keyed thereon as shown in Figure 5. The rod 72 extends through an aperture 78 formed in the plate 76 and is connected to the upper end of the arm 77. The arm 77 is normally urged to the right in Figure 5 by a spring 79 and bears against the free end of an armature 80 of the electromagnetic device 21. The armature 80 is pivoted at 81 and normally maintained in an upper position against a stop 82 by a spring 83.

Rotation of the spindle 74 and movement of the rod 72 to the right, as viewed in the figures, is also prevented by the engagement of the edge of the clutch bar 70 with the stop member 96.

When a key, such as key 51, is depressed the clutch bar 70 is raised by the end of the key above the stop member 96 as shown in construction lines 70' in Figure 7. Mounted on the upper surface of the clutch bar 70, as indicated generally at 3, are the contact members 3', 3" and 3''' which are so arranged as to make contact when the clutch bar is raised.

As previously described as a result of the closure of the contacts 3', 3" and 3"', the magnetic device 21 is energized. When the magnetic device 21 is energized, the armature 80 is drawn downwardly permitting the arm 77 to move to the right in response to the urging of the spring 79. Motion of the arm 77 to the right results in movement of the rod 72 and of the universal clutch bar 70 and the locking bar 53 to the right, the parts thus assuming the positions as shown in Figure 4. As shown in Figure 4, motion of the universal clutch bar to the right opens the contacts 3 and motion of the locking bar 53 to the right locks the depressed key in a downward position and prevents depression of any of the other keys.

Rotation of the spindle 74 causes rotation of the arm 58, shown in Figure 6, having an end portion adapted to engage the contact members 59 and close the contact member 21' energizing the drive motor 22 which operates through the gear train 94 and drive chain 93 to rotate the drive shaft 55.

The printing and ticket issuing operations are accomplished by mechanisms associated with the drive shaft 55. Also driven by the drive shaft 55 is the cam 57 which is adapted to engage the arm 56 at the completion of the printing and ticket issuing cycle. Engagement of the arm 56 by the cam 57 causes the stirrup member 73 to be moved to the left, withdrawing the locking member 53 from below the pressed key and drawing the universal clutch member to the left. These members assume the positions shown in Figure 7.

Rotation of the shaft 55 also operates the cam 60 which, acting against the cam follower 61, insures positive contact of the switch 21'. At the completion of one revolution of the shaft 55 and during the period of time in which the cam 57 is acting upon the lever 56, the rise of the cam 60 has passed from the cam follower 61 and rotation of the shaft 74 acts to raise the left-hand end of the member 58, as viewed in Figure 6, and opens the contact 21'.

Affixed to each of the keys is an insulated disc 62. Also associated with each of the keys is a contact arrangement, indicated at 2, including a rotatable conductive disc 63 and a contact member 66 adapted to engage the disc. The disc 63 mounts the contact pins 65 and, depending upon the position of the disc 63, one or the other of the pins 65 will be engaged by the contact leaves 64 when the leaves 64 are separated by the member 62 upon depression of a key. The position of the disc 63 is determined by the class selected and, accordingly, either one or the other of the two contact members 64 will be electrically connected to the contact member 66 depending on the class being registered. Depression of the key 51 thus establishes a contact 2 of the appropriate class. This contact is opened after the printing and ticket issuing cycle is completed and the key 51 is released by the locking bar 53 and returned to its normal position by the action of spring 54.

The operation is as follows:

If a class key at 2 is closed, the three pairs of contacts at 3 are also closed. The closing of one pair, 3' completes a circuit via call line 4, slip ring 16, coil 13, and slip ring 15. Coil 13 is thus energised and the magnetic disc 10 is attracted to the continuously-rotating pot magnet 12. Shaft 6 is thus caused to rotate, taking with it its searcher arms 7, 8 and 9.

When searcher arm 9 comes onto the contact 9' which is connected to the sending station at which the class key has been pressed, two other circuits are completed. These are both by way of contacts 3" (which were closed when the class key was pressed), contact 9', searcher arm 9 and its brush. From the brush one circuit is completed through slip ring 17, coil 14, and slip ring 15 to negative: the other is completed through coil 20 to negative. As a result of the completion of the former circuit, coil 14 is energised. It is so wound that it then neutralises the effect of coil 13. The disc 10 then ceases to be attracted so that the shaft 6 is released from the continuously-driven shaft 5. As a result of the completion of the latter circuit, coil 20 is energised and the stationary magnet 19 attracts the disc 18 to arrest the motion of the shaft 6 and bring it to rest with searcher arm 9 on the appropriate contact 9'.

This rotation of shaft 6 also brings searcher arm 8 on to the contact 8' which is connected to the common line 2' of the sending station at which the class key has been pressed. It also brings searcher arm 7 on to the contact 7' which is connected to the magnetic device 21 of the same sending station.

Searcher arm 8 thus completes a circuit from positive, through the closed contacts 3'", registering device 23, line 2' contacts at 2 closed by the class key, the corresponding line 2", through the appropriate class registering device 2'" to negative. The registering means 23 operates to register the total of all tickets issued. It also closes the contacts 23'. The registering means 2'" operates to register the total of tickets issued in the appropriate class. It also closes the corresponding pair of contacts 2''''. This completes a circuit from positive, through the closed contacts 23', searcher arm 7, contact 7', through magnetic device 21, to negative. The device 21 thus closes switch 21' to start motor 22, as a result of which a ticket is issued. At the same time all three pairs of contacts at 3 are re-opened. The coils 13, 14 and 20 are thus de-energized, leaving the shaft 6 with its searcher arms in its last position and free for further rotation when required. The circuits through the recording means 23 and 2'" are also broken, so that contacts 23' and 2'''' re-open. When the ticket has been issued, the contacts of the depressed class key at 2 are also re-opened.

If in the meantime another call signal has been generated from another sending station the magnet coil 13 will remain energised so that as soon as the neutralising and motion-arresting coils are de-energised the rotatable unit will rotate further until the searcher arm 9 reaches the appropriate contact when the operation will again be as described.

If the call line 4 has no signal imposed upon it the rotatable unit will remain stationary until it has. If the same sending station should generate another impulse, whether of the same or another class, the operations described will of course be carried out without the rotatable unit and searcher arms moving further.

If keys are pressed at two stations simultaneously the rotatable unit will first rotate until the searcher arm comes on to the contact associated with one of them. It will stop there momentarily until the operations described have been completed for that sending station, the contacts 3 of which will then be re-opened. However the contacts 3 of the other station will have remained closed so that the rotatable unit will then immediately turn until the searcher arm 9 reaches the contact which is being held energised by the second station.

With the system described a common call line 4 and a common impulse line together with common class lines 2" (one for each class) are used for a multiplicity of stations in contradistinction to a plurality of separate call, impulse and class lines frequently used in rotary line switch or relay collection systems.

In those cases in which totalising means are required to register impulses from a multiplicity of stations, and in which there is no difference in class at all stations, a simplified form of the arrangement described above can be adopted.

Thus the call line 4, which is brought into circuit by the contacts 3' when a key is pressed at the sending station, may be dispensed with, and the magnetising coil 13 independently and continuously energised while the apparatus is in operation.

Furthermore a registering relay may be inserted in series in the common line from the brush of arm 9 that is extended to energise the neutralising and brake coils, which may be arranged upon operation to break the earth connection to the sending station. Thus the coils in that circuit, i. e. 14 and 20, would be de-energised and the shaft and arms continue to rotate until the arms come on to a contact energised from another station. The installation would then need only one searcher arm and group of contacts; moreover only one pair of key contacts would be necessary at each sending station in place of the three described above. Thus in a case where it is required to record on a single register uniclass impulses from a multiplicity of stations, only one line would be required to the device from each station and one common earth line to all the stations.

Fig. 3 illustrates an alternative arrangement that may be employed and in which there is incorporated a modified form of electro-magnetic driving device shown to an enlarged scale in order more clearly to illustrate its details of construction. In this arrangement, the contacts 3' are adapted to establish a circuit from positive over a "call line" 4 which, as before, is common to all the sending stations, to an electro magnetic driving device for effecting a driving connection between a driving gear 33 and a rotatable unit consisting, as in the previous embodiment, of a shaft 6 of non-magnetic material mounted in bearings 25 and 25a. The gear 33 is rotated continuously by an electric motor (not shown). The speed of rotation depends upon the maximum number of sending station signals that have to be intercepted and distributed.

Here again shaft 6 carries three searcher arms 7, 8 and 9 and one of the elements of the aforesaid driving device or clutch is constituted by a disc 10 of magnetic material mounted on the end of the shaft 6. The disc 10 is mounted so that it rotates with the shaft 6 but is able to make a limited axial movement on it. For this purpose it has a ring and holes through which pass freely pins fixed in a disc 11 which is secured to the shaft 6 so that the disc floats on the shaft.

The other element of the driving clutch is constituted by a pot like member 34 of magnetic material fixed to a brass cage 37, and also mounted in position on the cage is a gear wheel 33a that is in continual mesh with the driving gear 33. The cage 37 is mounted on two ball races 41 fitted to a spindle 42 which is also the centre core of the magnet. 35 is a spacer which is fitted to the spindle 42 to act as an alignment fixture for the ball races. The cage 37 with its attached magnet pot-like member 34 revolves round the spindle 42 and the magnet coil 32 is fixed to the spindle 42 and remains stationary. The current feed lines to the magnet coil are fed through a central opening formed longitudinally through the spindle 42 and in this manner the use of feed rings and brushes to carry the current to the coil are dispensed with. The disc 10 is normally spaced from the pot-like member 14 by a small air gap, for example, of the order of one three thousandth part of an inch. As already stated, the pot-like member encloses the magnet coil 32 fixed to the spindle or core 42, the inner ends of the winding of the coil being connected to a point of negative potential and the outer ends of the winding being connected to the call line 4. The other or right hand end of the shaft 6 is provided with a magnetic disc 18 which is similar to the disc 10 and it co-operates with the second pot-like magnet 19 which is similar to that described in the previous embodiment in that it encloses a coil 20 and both the pot and the coil are stationary. 24 is the end plate to which the magnet pot and core 19 are fixed.

The disc 18 and the stationary magnet device 19, 20, together form a motion arrestor for the shaft 6, the coil 20 being connected between searcher arm 9 and negative.

The searcher arms 7, 8 and 9 sweep over sets of contacts 7', 8' and 9' respectively, the number of contacts in each of these sets being equal to the number of sending stations. The arm 7, its carrier, the brush maintaining continuous contact with it, and its set of contacts 7' are seen in end view in Fig. 2, in which the shaft 6 appears in section. The other searcher arms and sets of contacts are similar.

The contacts 9' are each connected to one of the contacts of the pairs 3" at the sending stations. The contacts 8' are connected to the lines 2' common to the class contacts 2 at the sending stations. Each contact 7' is connected to a magnetic device 28, of which there is one at each sending station. When actuated, the magnetic latch device 28 closes a switch 28' to start an electric motor 27 to cause a ticket to be issued, and it also re-opens the 3 pairs of contacts at 3.

One of the third pair of contacts 3''', is connected to the brush of searcher arm 8 by way of registering means 23 for registering the total number of tickets of all classes that are issued. Each time the device 23 is actuated it closes a pair of contacts 23' in the common line connecting one of each pair of contacts 2'''' to the brush of searcher arm 7. The other contacts of these pairs are all connected to positive as shown.

The operation is as follows:

If a class key at 2 is closed, the three pairs of contacts at 3 are also closed. The closing of one pair, 3' completes a circuit via call line 4, coil 32 to negative battery. Coil 32 is thus energised and the magnetic disc 10 is attracted to the continuously rotating magnet pot 34. Shaft 6 is thus caused to rotate, taking with it the searcher arms 7, 8 and 9.

When searcher arm 9 comes on to the contact 9' which is connected to the sender station at which the class key has been pressed, a circuit is completed from the sender station positive current at 3 via 3" contacts closed, line I, contact 9', searcher arm 9, searcher arm brush, coil 20 to negative battery. Coil 20 is thus energised and disc 18 is attracted to the magnet pot 19 to arrest the motion of the shaft 6. The arresting and holding power of coil 20 is designed to be sufficiently strong enough effectively to overcome the pull or driving power of the coil 32, thereby all searcher arms are held on contacts applicable to the one sending machine where the key is pressed. Searcher arm 8 is in contact with 8' which is connected to the common line 2' of the sender station; thus, a circuit is completed from positive via 3''' closed, registering device 23, searcher arm brush, arm 8, contact 8', line 2', contacts at 2 closed by the class key, the corresponding line 2'' through the appropriate class registering device 2''' to negative battery. The registering means 23 operates to register the total of all tickets issued. It also closes the contacts 23'. The registering means 2''' operates to register the total of all tickets issued in the appropriate class. It also closes the corresponding pair of contacts 2''''.

This completes a current from positive battery through the closed contacts 23', searcher arm 7, contact 7' through magnetic latching device 28 to negative battery. The device 28 closes switch 28' to start motor 27 as the result of which a ticket is issued. At the same time all three pairs of contacts at 3 are re-opened and cannot be closed again until the latching device has released at the completion of the issue of a ticket and the class selection key at 2 has re-opened.

The coils 32 and 19 are also de-energised leaving the shaft 6 with its searcher arm in its last position and free for further rotation when required. The circuit through the recording means are also broken so that contacts 23' and 2'''' re-open.

If in the meantime another call signal has been generated from another sending station the magnet coil 32 will remain energised so that as soon as the motion arrestor coil 19 has de-energised the rotatable unit will rotate further until the searcher arm 9 reaches the appropriate energise contact when the operation will be again as described.

If the call line 4 has no signal imposed upon it the rotatable unit will remain stationary until it has. If the same sending station should generate another impulse, whether of the same or another class, the operations described will of course be carried out without the rotatable unit and searcher arm moving further.

If keys are pressed at two stations simultaneously, the rotatable unit will first rotate until the searcher arm comes on to the contact associated with one of them. It will stop there momentarily until the operations described have been completed for that sender station, the contacts 3 of which will then be re-opened. However the contacts 3 of the other station will have remained closed so that the rotatable unit will then immediately turn until the searcher arm 9 reaches the contact which is being held energised by the second station.

The driving clutch need not be an electromagnetic clutch. It may be for example a permanent magnetic clutch or a cone, plate or other mechanical friction clutch the effect of which is overcome at the required time to cause the clutch to slip by braking the rotatable unit. A mechanical clutch engaged or disengaged electromagnetically may also be employed.

I claim:

1. In combination, a rotary switch comprising a contactor and a plurality of contacts engageable thereby, continuously rotating driving means for advancing said rotary switch, a magnetic clutch between said driving means and said rotary switch, a plurality of sending stations each having associated therewith switching means connected to one of said contacts, further switching means at each station for energizing said magnetic clutch and for causing advance of said switch, means comprising a magnetic brake for arresting advance of said rotary switch, means connecting said contactor and said arresting means to render the latter effective to arrest advance of said rotary means when the contactor engages a contact connected to a closed one of said switching means, a second rotary switch comprising a contactor and a plurality of contacts engageable thereby, said driving means advancing said second switch in synchronism with the first switch so that engagement of the contactor of the second switch with each contact thereof coincides with engagement of the contactor of the first switch with a corresponding contact thereof, and means controlled by said second switch for rendering the arresting means ineffective to restrain advance of said switches following each arresting action of said arresting means.

2. In combination, a rotary switch comprising a contactor and a plurality of contacts engageable thereby, continuously rotating driving means for advancing said rotary switch, a magnetic clutch between said driving means and said rotary switch, a plurality of sending stations each having associated therewith switching means connected to one of said contacts, further switching means at each station for energizing said magnetic clutch and for causing advance of said switch, means comprising a magnetic brake for arresting advance of said rotary switch, means connecting said contactor and said arresting means to render the latter effective to arrest advance of said rotary means when the contactor engages a contact connected to a closed one of said switching means, a second rotary switch comprising a contactor and a plurality of contacts engageable thereby, said driving means advancing said second switch in synchronism with the first switch so that engagement of the contactor of the second switch with each contact thereof coincides with engagement of the contactor of the first switch with a corresponding contact thereof, and means associated with each of said sending stations and controlled by said second switch for rendering the arresting means ineffective to restrain advance of said switches following each arresting action of said arresting means.

3. In combination, a plurality of sending stations, a set of switches at each of said sending stations, a set of registering devices, each of the sets of switches including a switch connected to each of the registering devices of the set, a rotary switch comprising a contactor and a plurality of contacts engageable thereby, continuously rotating driving means for advancing said rotary switch, a magnetic clutch between said driving means and said rotary switch, switching means at each of sending stations connected to one of said contacts, further switching means at each station for energizing said magnetic clutch and for causing advance of said switch, means comprising a magnetic brake for arresting advance of said rotary switch, means connecting said contactor and said arresting means to render the latter effective to arrest advance of said rotary means when the contactor engages a contact connected to a closed one of said switching means, a second rotary switch comprising a contactor and a plurality of contacts engageable thereby, said driving means advancing said second switch in synchronism with the first switch so that engagement of the contactor of the second switch with each contact thereof coincides with engagement of the contactor of the first switch with a corresponding contact thereof, and means controlled by said second switch and by the operation of any of said registering devices for rendering the arresting means ineffective to restrain advance of said switches following each arresting action of said arresting means.

4. In combination, a plurality of sending stations, a set of switches at each of said sending stations, a set of registering devices, each of the sets of switches including a switch connected to each of the registering devices of the set, a rotary switch comprising a contactor and a plurality of contacts engageable thereby, continuously rotating driving means for advancing said rotary switch, a magnetic clutch between said driving means and said rotary switch, switching means at each of sending stations connected to one of said contacts, further switching means at each station for energizing said magnetic clutch and for causing advance of said switch, means comprising a magnetic brake for arresting advance of said rotary switch, means connecting said contactor and said arresting means to render the latter effective to arrest advance of said rotary means when the contactor engages a contact connected to a closed one of said switching means, a second rotary switch comprising a contactor and a plurality of contacts engageable thereby, said driving means advancing said second switch in synchronism with the first switch so that engagement of the contactor of the second switch with each contact thereof coincides with engagement of the contactor of the first switch with a corresponding contact thereof, and means associated with each of said sending stations and controlled by said second switch and by the operation of any of said registering devices for rendering the arresting means ineffective to restrain advance of said switches following each arresting action of said arresting means.

ROBERT MILBURN.

REFERENCES CITED

The following references are of record in the file of this patent:

UNITED STATES PATENTS

| Number | Name | Date |
|---|---|---|
| 1,966,623 | Fuller | July 17, 1934 |
| 2,032,972 | Black et al. | Mar. 3, 1936 |
| 2,049,634 | Troutman | Aug. 4, 1936 |
| 2,068,719 | Troutman | Jan. 26, 1937 |